Aug. 25, 1964  F. L. BARTON, JR., ET AL  3,146,083
MARKING OF GLASS SHEETS
Filed April 2, 1959  3 Sheets-Sheet 1

INVENTORS
Frank L. Barton, Jr.
BY and Walter L. Miller
Nobbe & Swope
ATTORNEYS

Aug. 25, 1964 — F. L. BARTON, JR., ETAL — 3,146,083
MARKING OF GLASS SHEETS
Filed April 2, 1959 — 3 Sheets-Sheet 2

INVENTORS
Frank L. Barton, Jr.
BY and Walter L. Miller
Nobbe & Swope
ATTORNEYS

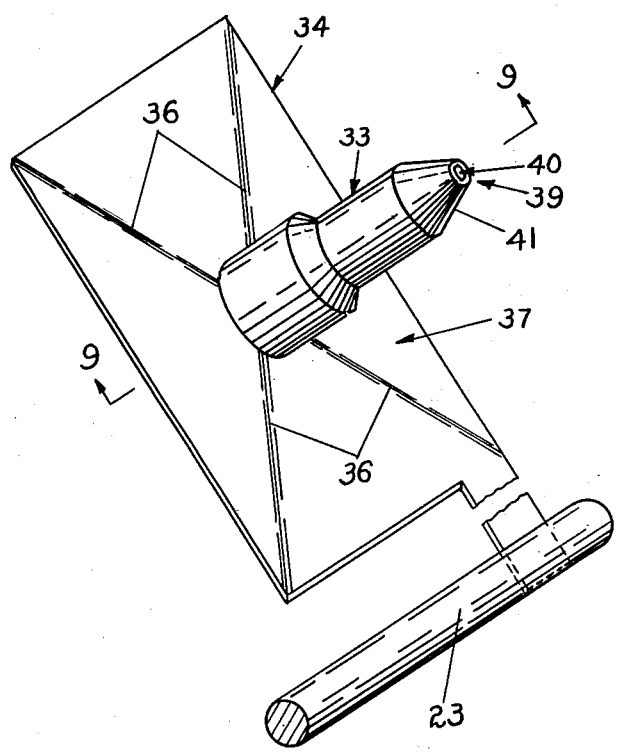
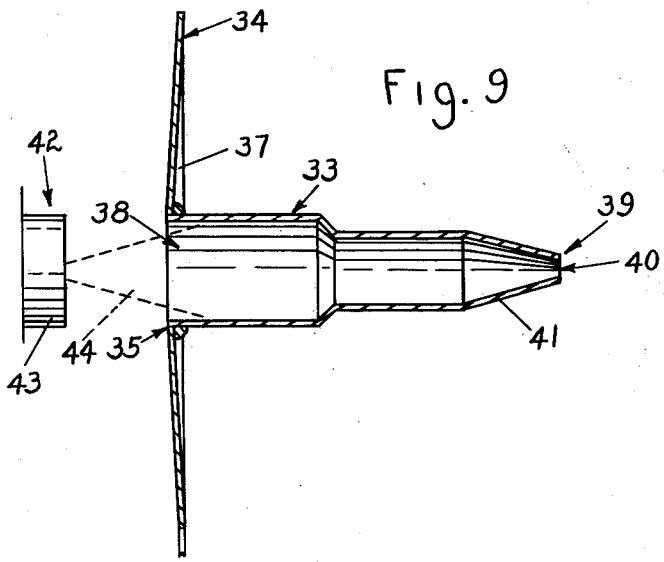

United States Patent Office 3,146,083
Patented Aug. 25, 1964

3,146,083
MARKING OF GLASS SHEETS
Frank L. Barton, Jr., Perrysburg, and Walter L. Miller, Toledo, Ohio, assignors to Libbey-Owens-Ford Glass Company, Toledo, Ohio, a corporation of Ohio
Filed Apr. 2, 1959, Ser. No. 803,740
7 Claims. (Cl. 65—60)

The present invention relates broadly to the bending and cutting of glass sheets and more particularly to a method and apparatus for marking bent glass sheets having a compression pattern therein.

It is known that the peripheral edge or margin of a glass sheet will be stronger and more resistant to chipping or fracture if a compressional stress is developed in such marginal areas. Accordingly, to produce suitably edged glass articles, such as automobile windshields, which in keeping with the design of modern cars are bent to increasingly sharp curvatures, provision is made in the molds by which the glass sheets are bent to orient the known stresses, such as tension and compression, and to develop a suitable outline in the sheets that will possess compressional stress.

Since glass sheets to be used for automobiles are usually bent in blank size and subsequently pattern cut, it is necessary to carefully orient the bent sheet on the cutting machine so that the path of the scoring tool will pass through an area of the sheet that is in compression. Since stress areas in the bent sheets are invisible, this has proved extremely difficult to accomplish.

Therefore the primary object of the present invention is to provide a novel method and apparatus for marking bent glass sheets so that the sheets may be properly oriented in a pattern cutting device.

Other objects and advantages of the invention will become more apparent during the course of the following description when taken in connection with the accompanying drawings.

In the drawings wherein like numerals are employed to designate like parts throughout the same:

FIG. 8 is an enlarged perspective view of a portion of the marking means shown in FIG. 3 and which is affixed to a mold; and FIG. 9 is a sectional view along lines 9—9 of FIG. 8 and also showing a portion of the spray means introducing the marking medium.

It is known that glass sheets resting on a bending mold when heated are bent into conformity with the shaping surface of the mold. After being bent, certain portions of the sheet are cooled at a different rate than other portions to establish a compression stress. In order to produce pattern cut bent glass sheets, in which this stress appears in a marginal edge, it has been found desirable to place upon the sheets, while still in the mold, locating or index markings. This insures that when the sheets are removed from the mold and transferred to the template cutting tables, the sheets may be properly positioned with respect to the cutting tool. This means that the pattern cutting machine will accurately pattern cut the sheets through the areas thereof in compression.

Figure 1:
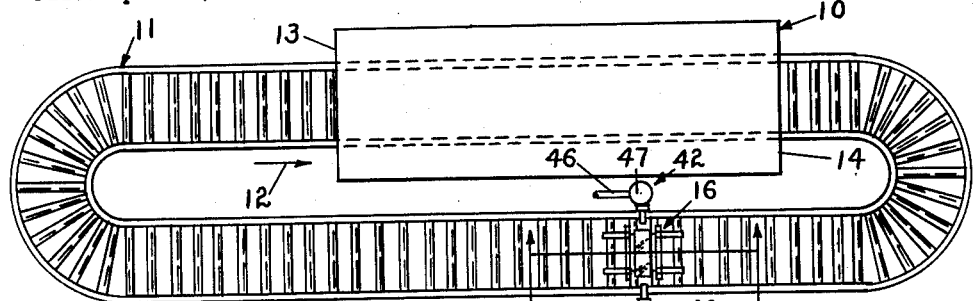
FIG. 1 is a plan view showing the general location of the marking device of the present invention.

Referring more particularly to the drawings there is shown in FIG. 1 a conventional bending and tempering furnace 10 through which the glass sheets to be bent are carried in molds along conveyor 11 in the direction of arrow 12. The molds, and glass supported thereon, enter the furnace end 13 passing therethrough and emerging from furnace end 14, the glass having sagged into conformity with the mold shaping surface and having been annealed. The glass and mold continue along conveyor 11 towards and through a marking station generally indicated at 15 where according to the present invention the indexing marks are applied to the bent glass resting on the mold.

The bending apparatus 16 comprises a substantially rectangular mold 17 having a shaping surface of desired curvature and in accordance with customary bending procedures, flat glass sheets are supported upon the mold and softened by heat until they bend downwardly into conformity with the mold shaping surface. As here shown, the mold 17 comprises a central section 18 and end section 19 each of which has a portion of the shaping surface 20 formed thereon. The mold end sections are pivotally connected to the central section by hinges 21, and the entire mold 17 is carried on a rack or base 22 by transverse rods 23 secured to the end sections 19 and supported at their ends in links 24. The links 24 are swingably supported at their upper ends on pins 25 that are fixed in posts 26 which form a part of the base 22 and are disposed in the respective corners thereof.

By means of the hinges 21 and rods 23, the end mold sections 19 are adapted to be moved from a closed position, to an open position. In the open position, the mold supports one or a pair of flat glass blanks, or rectangular sized sheets in a horizontal position prior to the bending thereof. As the mold and glass sheets are passed through the furnace the sheets become softened, upon reaching a temperature in the neighborhood of about 1100° F., and tend to sag. At this time, the mold end sections swing upwardly and inwardly and thus assist in bending the sheets 27 into conformity with the shaping surfaces 20 on the central and end mold sections.

Figure 3:
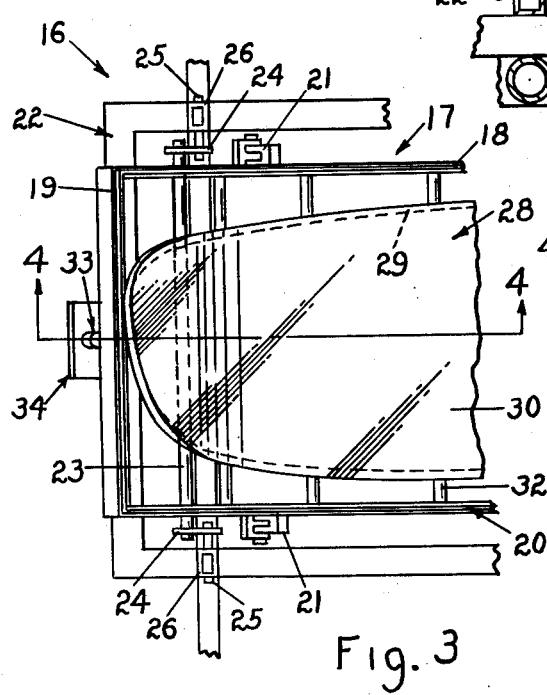
FIG. 3 is a fragmentary plan view of one end of a bending mold built in accordance with the present invention.
Figure 4:
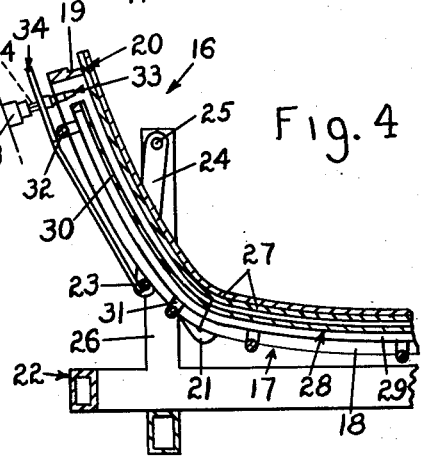
FIG. 4 is a fragmentary longitudinal sectional view taken along lines 4—4 of FIG. 3.
Figure 5:
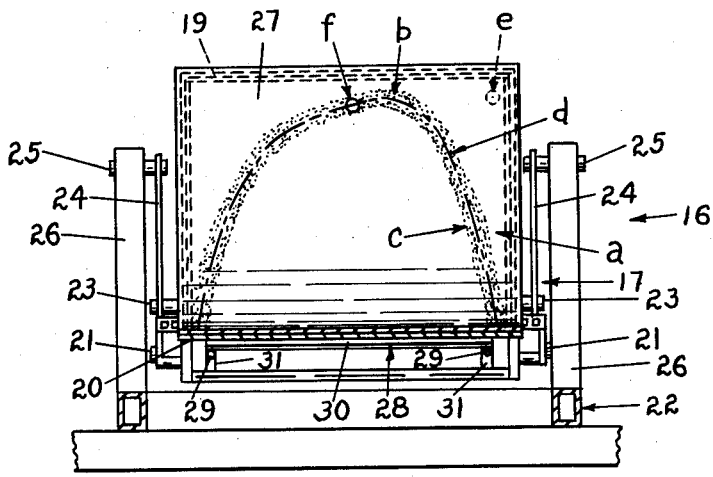
FIG. 5 is a transverse sectional view taken along the lines 5—5 of FIG. 4.

After the glass sheets have been bent, the bending mold is moved into an annealing zone wherein the sheets and mold are subjected to the influence of modulated cooling air which gradually reduces the temperature of the glass sheets to substantially room temperature. However, it has been found that the mold cools at a relatively slower rate than the glass and thus the shaping surface 20 of the mold retards the cooling of the marginal edge portions of the glass sheet in contact therewith and thus produces marginal areas of tension $a$ in the glass sheets, as shown in FIG. 5, while the marginal portions $b$ located inwardly thereof are usually in compression. In order to definitely establish this compression area, a heat absorbing member is employed in combination with the mold and has the effect of retarding the cooling of the centrally disposed areas $c$ of the glass sheets. For this purpose, a metallic heat absorber or shield 28 is employed. The shield 28 is of substantially the same shape as the glass sheets to be subsequently pattern-cut from the substantially rectangular sheets or blanks 27 but is of a relatively smaller size. As shown in FIGS. 3 and 4, the shield comprises a rail 29 and a thin metal membrane 30. The shield is formed of sections that are carried by the related sections of the mold so as to be movable therewith. The rail portions 29, which carry the membrane 30, may be supported on posts 31 carried by rods 32 that are fixed at their ends to the respective section of the mold.

As previously mentioned, the bending temperature of the glass sheets is somewhat in excess of 1100° F. After the bending mold enters the furnace annealing section, the temperature of the sheets is reduced through the critical annealing range; that is, from about 1000° F. to about 900° F. After the glass temperature is reduced below the lower limit of the critical annealing range, the effect of the mold on the glass is not too critical as far as setting up internal stresses in the glass is concerned.

While passing through the annealing zone, the marginal areas of the glass sheets indicated by the letter $a$ (FIG. 5), will be retarded in cooling by the slower rate of cooling of the shaping surface 27 of the mold and thereby placed in tension while the central portions of the sheet indicated $c$ will likewise be retarded in cooling by the shield 28 and thus also placed in tension. However, since the marginal portions of the glass sheets between the shaping surface 27 and the rail 29 of the shield are not materially affected, they will cool at a relatively more rapid rate and thus will have compression stresses. Accordingly, between areas $a$ and $c$ there will be located an area $b$ which will be in compression and which, while normally invisible, can under proper optical inspection be distinguished from the tension areas $a$ and $c$.

In subsequently cutting the glass sheets to pattern (desired size and shape) the said sheets are cut or scored along the lines $d$ (FIG. 5) extending either through the compression area or along the outer edge thereof so that the edges of the cut sheets will be in compression.

In accordance with the invention and after the bending apparatus has passed through the annealing zone, the two glass sheets 27 are preferably secured together by spots of suitable adhesive $e$ inserted between the sheets at the corners thereof and then a reference mark $f$ is placed on the lowermost sheet before the sheets are removed from the bending mold at the cut line. Therefore, when the blank is later cut, a portion of the mark is removed with the cut edge trim and the remainder of the mark will be covered by the frame molding used to install the glass. This obviates the necessity for eradicating the marks by hand or mechanical means from the glass. As will be later described, the cutting machine which cuts the sheets to pattern outline is provided with indexing means whereby, through use of the mark $f$, the glass sheets are properly oriented on the cutting machine so that the cutting head thereof may properly score the sheets along the compression area $b$.

In order to mark the bent glass sheets there is provided a pair of mold mounted hollow elongated tubular members 33, only one being shown, it being understood that there is an identical member on the opposite end of the mold. Each tubular member 33 is supported by a plate 34 that as seen in FIGS. 4 and 8, is suitably welded to transverse rod 23. Member 33 extends through central opening 35 of plate 34 and the inner end of the tubular member 33 passes through the shield 30. The member 33 is by plate 34 bodily positioned to axially locate the same substantially normal to the plane of the shield 30 and also normal to the plane of the portion of the sheets 27 opposite the tip of said member 33 when the mold is in a closed position. Plate 34 is also creased along intersecting diagonal lines 36 on at least one surface 37 of plate 34 to stiffen plate 34 and to prevent any possibility of swaying of the tube 33 relative to the sheets 27. In the embodiment illustrated in FIGS. 8 and 9, the tube or funnel 33, 3¾ inches long, has a gradually and incrementally reduced inner diameter for a major portion of its length on moving from its liquid receiving end 38 towards its liquid discharge end 39 and towards the glass sheets to be marked. This insures proper spray concentration at the tube exit and therefore provides for proper marking. There is a ⅛ inch diameter opening 40 at the exit end 39 of member 33, and member 33 tapers along a minor portion of its length adjacent exit end 39 at 41 towards that opening.

Figure 2:
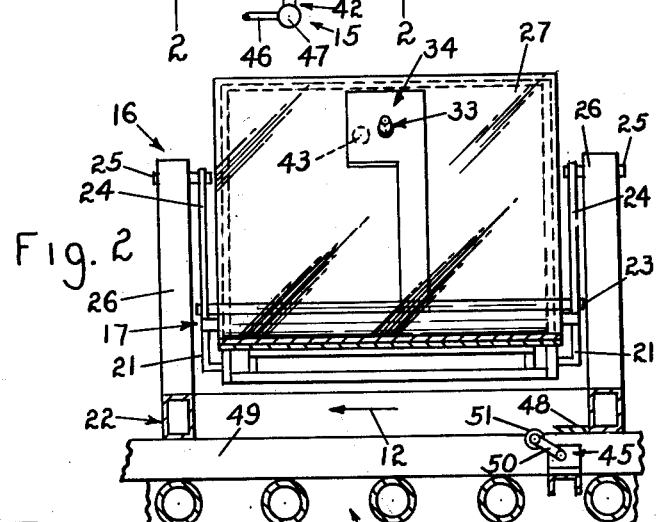
FIG. 2 is a sectional view along lines 2—2 of FIG. 1.

Positioned in station 15 (FIG. 1) on each side of the path of the molds are a pair of compression operated liquid spray delivering devices 42 (FIG. 1) one mounted on each side of conveyor 11. These devices each have a spray nozzle 43 (FIGS. 2 and 9) through which is directed a suitable liquid spray, shown dotted at 44 in FIG. 9. The liquid, as will now be described, is delivered in a fine spray when mold 17 trips switch 45 mounted on the frame of the conveyor 11. There are suitable liquid supply pipes 46 leading to a suitable source of a marking liquid and compressors 47 insure the proper issuance of the spray from nozzles 43. The actuating switch 45 is so located that it will cause both devices 43 to direct spray 44 towards the two tubes 33 when the tubes 33 are aligned with the nozzles 43, that is when the mold 17 moving along conveyor 11 approaches the position where the center line of the nozzles 43, or point source of the marking liquid, will be aligned with the center line of tubes 33. When this alignment is in fact accomplished the plate 48 (FIG. 2) on mold brace 49 passing over switch 45 will trip switch 45, by depressing upwardly inclined pivotable arm 50 through a downward force on freely rotating roller 51 carried by arm 50.

Care must be taken to insure that spray pattern 44 is restricted as much as possible to entrance 38 although plate 34 will act as a shield to prevent the spray from spreading onto the mold in the case of poor timing of the alignment of nozzle 43 with tube 33. Also it is desirable to restrict the metal area of the tip of member 33 next to glass 27 to as small a total area as practical in order to avoid any effect on the strain pattern in the glass. In this same regard the tip 39 of member 33 is placed as close as possible to the sheets 27 without adversely affecting the strain pattern. Thus a ⅛ inch opening is used to insure formation of a ¼ inch diameter mark. In addition this opening insures that the atomized spray will not introduce air currents of sufficient magnitude to have any undesirable effect on the strain pattern of the glass and yet to allow the passage of sufficient spray to place an indexing mark on the glass. The incremental step down is also necessary in order that the wide spray emitted by nozzle 38 can be properly channeled and controlled as above discussed. Thus there has been provided mold actuated means for marking or indexing the glass carried by each successive mold 17 passing through station 15 so that the glass 27 can be moved to a cutting machine and properly located relative to the cutting tool to achieve the proper pattern cut glass.

Since the lowermost glass sheet is marked while the two sheets are still on the mold, the distance from the marks $f$ to the compression area $b$ in the sheets is known. By properly orienting the marks $f$, and thus the compression areas $b$, on the cutting machine, a pattern-cut sheet having the edge portion thereof in compression may be accurately formed.

Figure 6:
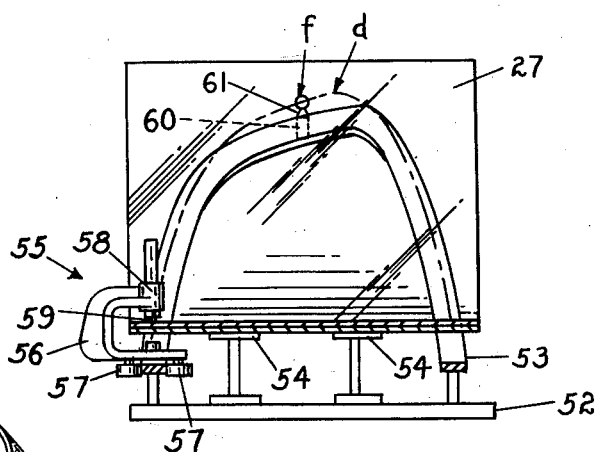
FIG. 6 is a schematic view of a cutting machine for cutting the glass sheets.

As diagrammatically shown in FIG. 6, the cutting machine is of the type disclosed in the co-pending application of J. R. Morris and F. E. Henning, Serial No. 428,778, filed May 10, 1954, now Patent No. 2,932,087 to which reference is made, and comprises a base 52, having a template 53 in the form of a continuous rail-like track mounted thereon. Within the template 53, there is provided suitable means 54 for locating and supporting the pair of glass blanks 27 as a unit in proper relation.

By means of a cutter unit or head 55, a score line, as indicated by the line $d$, is made successively in first the upper and then the lower glass blank. Briefly, this cutter head may comprise a frame 56 adapted to traverse the template 53 by means of suitably mounted rollers 57 and which supports a cylinder 58. Within this cylinder is an air-actuated mechanism by which the cutting wheel 59 is moved toward or away from the glass surface. Preferably, the frame 56 is supported by rollers 57 on the template 53 so that the cutting wheel 59 will at all times be positioned in a plane normal to the surface of the glass. In other words, the template 53 is so formed as to conform not only to the contour of desired curvature but also the outline of the pattern to be cut from the glass so that the cutter head 55 in following the template will be described a path substantially the same as the line $d$ and enclose the sheet portion in compression.

To properly orient the glass sheets 27 upon the template 53, a bar 60 extends inwardly from each end of the template and is provided with a pointer 61. The pointer 61 is located on the template, with respect thereto, so that when aligned with the marks $f$ on the glass sheets, the sheets are properly located on the cutting machine to enable the cutter head 55 to score the pattern outline along the line $d$.

In cutting the pair of marked glass sheets, the sheets are positioned on the supporting means 54 of the cutting machine and adjusted until the reference marks $f$ register with the pointers 61 at which time the line $d$ is located substantially midway in the compression area $b$. The cutting head 55 is then caused to traverse the template 53 and score the uppermost glass sheet to pattern outline which of course is properly positioned due to being secured to the lowermost sheet. After being scored, the uppermost sheet is removed and the lower sheet is then similarly scored.

Figure 7:
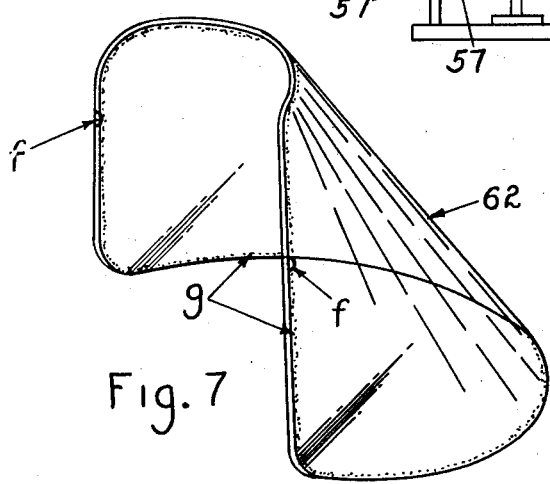
FIG. 7 is a perspective view of a bent glass sheet when cut.

After the scored blanks have been removed from the cutting apparatus and the salvage margins are broken away from the center area of each along the score line $d$, a glass sheet 62 of the desired outline and curvature, as seen in FIG. 7, will be obtained. As herein shown, the periphery of the sheet 62 is shaded, as at $g$ to indicate a marginal area of compression which can be ascertained upon inspection of the sheet with a polariscope equipped with color filter and, as previously noted, which will afford a stronger edge that is more resistant to chipping or fracture than those in tension.

Therefore to provide for the proper scoring of the pattern-cut sheet with respect to the compression area in the blank size sheet, the present invention insures that a blank size sheet, with or without a region of compression stress therein, is properly located on the cutting machine. It will be readily understood by those familiar with the art that if a blank size sheet is skewed with respect to the path of travel of the cutting head, the resultant pattern-cut sheet would not have the desired contour. However, in accordance with the present invention, by referencing a given spot or point on the glass sheet with respect to the mold shaping rail, and using the same spot or point on the sheet to reference or align the cutting head of the cutting machine, a correct contour in the pattern-cut bent sheet is assured.

It is to be understood that the form of the invention herewith described is to be taken as an illustrative embodiment only of the same, and that various changes may be resorted to without departing from the spirit of the invention or the scope of the subjoined claims.

We claim:
1. A glass sheet marking apparatus for use in combination with a sectionalized glass bending mold, said mold in the open position receiving a flat glass sheet and moving to a closed position when the glass sheet is subjected to sufficient heat to cause it to sag into conformity with the shaping surface of said mold and wherein said mold moves along a definite path upon a conveyor, the combination of a pair of hollow elongated tubular members, means for mounting said members on said mold one at each end of said mold so that the center axis of each of said members is normal to the plane of the bent glass sheet directly opposite said center axis when the mold is in a closed position, marking fluid directing means mounted on said conveyor and mold operated actuating means mounted to said conveyor causing said fluid directing means to deliver its marking fluid through said mold mounted tubular members and onto the glass sheets resting on said mold only when the center of said mold mounted tubular members is aligned with the center of said fluid directing means.

2. A glass sheet marking apparatus as defined in claim 1, said mold including a movable end section pivotably mounted to a mold carried transverse rod, said tubular member mounting means including a mounting plate fixedly mounted to said transverse rod, said plate having a centrally disposed opening through which said tubular member extends.

3. A glass sheet marking apparatus as defined in claim 2, including intersecting diagonal creases in at least one surface of said mounting plate.

4. A glass sheet marking apparatus as defined in claim 2, wherein said conveyor mounted marking fluid directing means includes a pair of compression operated liquid spray delivering devices, positioned adjacent the path of the molds, each of said devices including a nozzle to direct the marking liquid towards the glass sheet carried by the mold.

5. A glass sheet marking apparatus as defined in claim 4, wherein said mold operated actuating means includes switch means mounted on said conveyor means in the path of the mold to trigger into operation said conveyor mounted marking liquid directing means.

6. A glass sheet marking apparatus as defined in claim 5, wherein said switch means includes an upwardly inclined pivotable arm and a freely rotatable roller affixed to said arm, said roller being disposed in the path of a mold passing along the definite path, said mold including a leg brace to exert a downward force on said roller to actuate said conveyor mounted marking liquid directing means only when the center of each of said nozzles is aligned with the center of each of said tubular members.

7. A method of producing a pattern cut blank glass sheet comprising, bending a blank size glass sheet into conformity with the shaping surface on a bending mold, passing said mold and bent glass sheet resting thereon as a unit along a predetermined path, spraying marking fluid toward the moving glass sheet from a stationary point source, conically converging the sprayed fluid along an axis normal to a portion of the surface of the bent sheet, said axis of convergence advancing with the sheet so as to place a circular indexing mark thereon while said sheet is continuously moving along said path, and scoring the sheet along a path of travel oriented with respect to the indexing mark to position said path of travel with respect to the sheet portions in contact with the mold shaping surface.

References Cited in the file of this patent
UNITED STATES PATENTS

| | | |
|---|---|---|
| 1,256,599 | Schoop | Feb. 19, 1918 |
| 1,809,534 | Tillyer et al. | June 9, 1931 |
| 2,067,949 | Rez | Jan. 19, 1937 |
| 2,114,723 | Paasche | Apr. 19, 1938 |
| 2,321,840 | McDougal | June 15, 1943 |
| 2,577,611 | Eves | Dec. 4, 1951 |
| 2,601,700 | Pinsky et al. | July 1, 1952 |
| 2,783,708 | La Goy | Mar. 5, 1957 |
| 2,880,553 | Carson | Apr. 7, 1959 |
| 3,027,870 | Schirmer | Apr. 3, 1962 |